US008041081B2

(12) United States Patent
Hu (10) Patent No.: US 8,041,081 B2
(45) Date of Patent: Oct. 18, 2011

(54) METHOD, APPARATUS, AND PROGRAM FOR HUMAN FIGURE REGION EXTRACTION

(75) Inventor: Yi Hu, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 1147 days.

(21) Appl. No.: 11/819,465

(22) Filed: Jun. 27, 2007

(65) Prior Publication Data
US 2008/0002890 A1 Jan. 3, 2008

(30) Foreign Application Priority Data

Jun. 28, 2006 (JP) .................................. 2006-177454

(51) Int. Cl.
*G06K 9/00* (2006.01)
(52) U.S. Cl. ......................... 382/118; 382/117; 382/154
(58) Field of Classification Search .................. 382/103, 382/118, 117, 154
See application file for complete search history.

(56) References Cited

U.S. PATENT DOCUMENTS

| 5,881,170 | A | * | 3/1999 | Araki et al. | 382/199 |
| 5,933,529 | A | * | 8/1999 | Kim | 382/199 |
| 5,978,100 | A | * | 11/1999 | Kinjo | 358/453 |
| 6,529,630 | B1 | * | 3/2003 | Kinjo | 382/190 |
| 6,658,150 | B2 | * | 12/2003 | Tsuji et al. | 382/218 |
| 6,697,502 | B2 | * | 2/2004 | Luo | 382/115 |
| 6,775,403 | B1 | * | 8/2004 | Ban et al. | 382/154 |
| 7,003,135 | B2 | * | 2/2006 | Hsieh et al. | 382/103 |
| 7,224,831 | B2 | * | 5/2007 | Yang et al. | 382/154 |
| 7,324,693 | B2 | * | 1/2008 | Chen | 382/199 |
| 7,379,591 | B2 | * | 5/2008 | Kinjo | 382/170 |
| 7,593,552 | B2 | * | 9/2009 | Higaki et al. | 382/118 |
| 7,689,011 | B2 | * | 3/2010 | Luo et al. | 382/118 |
| 2001/0002932 | A1 | * | 6/2001 | Matsuo et al. | 382/118 |
| 2001/0005219 | A1 | * | 6/2001 | Matsuo et al. | 348/169 |
| 2002/0031265 | A1 | * | 3/2002 | Higaki | 382/199 |
| 2003/0053685 | A1 | * | 3/2003 | Lestideau | 382/164 |
| 2003/0133599 | A1 | * | 7/2003 | Tian et al. | 382/118 |

(Continued)

FOREIGN PATENT DOCUMENTS

JP  2001175868  * 6/2001

(Continued)

OTHER PUBLICATIONS

Interactive-images, Yuri et al., ICCV, vol. 1 Jul. 2001, pp. 105-112.*

(Continued)

*Primary Examiner* — Samir Ahmed
*Assistant Examiner* — Jayesh A Patel
(74) *Attorney, Agent, or Firm* — Birch, Stewart, Kolasch & Birch, LLP (57) ABSTRACT

Upon extraction of a human figure region in an image, a face or facial part is detected in the image, and an estimated region which is estimated to include the human figure region is determined from position information of the detected face or facial part. The human figure region is extracted in the estimated region. Judgment is made as to whether at least a portion of the human figure region exists in an outline periphery region of the estimated region, and the estimated region is extended and updated so as to include a near outer region near the human figure region in the outline periphery region and outside the estimated region, in the case where a result of the judgment is affirmative. The human figure region is extracted in the extended and updated estimated region.

9 Claims, 7 Drawing Sheets

U.S. PATENT DOCUMENTS

| | | | |
|---|---|---|---|
| 2004/0028260 A1* | 2/2004 | Higaki et al. | 382/118 |
| 2004/0190752 A1* | 9/2004 | Higaki et al. | 382/103 |
| 2004/0213460 A1* | 10/2004 | Chen | 382/199 |
| 2005/0180611 A1* | 8/2005 | Oohashi et al. | 382/118 |
| 2005/0196015 A1* | 9/2005 | Luo et al. | 382/103 |
| 2006/0133654 A1* | 6/2006 | Nakanishi et al. | 382/118 |
| 2006/0170769 A1* | 8/2006 | Zhou | 348/143 |
| 2009/0041297 A1* | 2/2009 | Zhang et al. | 382/103 |

FOREIGN PATENT DOCUMENTS

| | | | |
|---|---|---|---|
| JP | 2005-339363 A | 12/2005 | |

OTHER PUBLICATIONS

Y. Boykov et al., Proc. of Int. Conf. on Computer Vision, vol. I, pp. 105-112, 2001.

G. Mori et al., "Recovering Human Body Configurations: Combining Segmentation and Recognition", CVPR, p. 1-8, 2004.

M. Orchard et al., IEEE Transactions on Signal Processing, vol. 39, No. 12, pp. 2677-2690, 1991.

C. Rother et al., ACM Transactions on Graphics(SIGGRAPH'04), 2004.

* cited by examiner

METHOD, APPARATUS, AND PROGRAM FOR HUMAN FIGURE REGION EXTRACTION

BACKGROUND OF THE INVENTION

1. Field of the Invention

The present invention relates to a method and an apparatus for extracting a human figure region in an image. The present invention also relates to a program that causes a computer to execute the method.

2. Description of the Related Art

For image editing such as image classification, automatic trimming, and electronic photo album generation, extraction of human figure regions and recognition of poses in images are expected. As a method of extraction of human figure regions by separation from backgrounds in images, a method described in Japanese Unexamined Patent Publication No. 2005-339363 has been known, for example. In this method, a person is photographed with a predetermined specific background, and a human figure region is cut out from the background based on the difference in colors therebetween.

In addition to the method using a predetermined background setting as has been described above, a method of separating a human figure region from any arbitrary background in an image by advance manual input of information on a portion of the human figure region and the background has been proposed in Y. Boykov and M. Jolly, "Interactive Graph Cuts for Optimal Boundary & Region Segmentation of Objects in N-D Images", Proc. of Int. Conf. on Computer Vision, Vol. I, pp. 105-112, 2001. This method, which adopts advance specification of a portion of human figure region and background, has been used mainly for interactive cutting.

Furthermore, an automatic human figure region extraction method has been proposed in G. Mori et al., "Recovering Human Body Configurations: Combining Segmentation and Recognition", CVPR, pp. 1-8, 2004. In this method, a whole image is subjected to region segmentation processing and judgment is made on each region as to whether the region is a portion of a human figure region based on characteristics such as the shape, the color, and texture thereof. An assembly of the regions having been judged to be the portions is automatically extracted as a human figure region.

However, in this method of human figure region extraction using the characteristics of respective regions generated through segmentation, human figure regions cannot be extracted correctly in the case where a degree of segmentation is not appropriate for human figure extraction such as cases where regions generated through segmentation are too small for accurate judgment of portions of human figure regions, or too large and include background regions as well. Therefore, the accuracy of human figure region extraction is strongly affected by the degree of segmentation in this method.

SUMMARY OF THE INVENTION

The present invention has been conceived based on consideration of the above circumstances, and an object of the present invention is therefore to provide a method, an apparatus, and a program that automatically extract a human figure region in a general image with improved extraction performance.

A human figure region extraction method of the present invention is a method of extracting a human figure region in an image, and the method comprises the steps of:

detecting a face or facial part in the image;

determining an estimated region which is estimated to include the human figure region, based on position information of the detected face or facial part;

extracting the human figure region in the estimated region;

judging whether at least a portion of the extracted human figure region exists in an outline periphery region in the estimated region;

extending and updating the estimated region so as to include a near outer region that is located near the human figure region in the outline periphery region and outside the estimated region, in the case where at least a portion of the human figure region has been judged to exist; and extracting the human figure region in the extended and updated estimated region.

In the method described above, it is preferable for the steps of judging, extending and updating, and extracting in the extended and updated estimated region to be repeated until the human figure region has been judged not to exist in the outline periphery region.

A human figure region extraction apparatus of the present invention is an apparatus for extracting a human figure region in an image, and the apparatus comprises:

face detection means for detecting a face or facial part in the image;

estimated region determination means for determining an estimated region which is estimated to include the human figure region, based on position information of the detected face or facial part;

human figure region extraction means for extracting the human figure region in the estimated region; and judgment means for judging whether at least a portion of the extracted human figure region exists in an outline periphery region in the estimated region, wherein, in the case where the judgment means has judged that at least a portion of the human figure region exists, the estimated region determination means extends and updates the estimated region so as to include a near outer region that is located near the human figure region in the outline periphery region and outside the estimated region, and the human figure region extraction means extracts the human figure region in the extended and updated estimated region.

In the human figure region extraction apparatus, it is preferable for the judgment means, the estimated region determination means, and the human figure region extraction means to repeatedly carry out the judgment on whether at least a portion of the human figure region exists in the outline periphery region, the extension and update of the estimated region, and the extraction of the human figure region in the extended and updated estimated region until the judgment means has judged that the human figure region does not exist in the outline periphery region.

The human figure region extraction means can calculate an evaluation value for each pixel in the estimated region from image data therein and from image data in an outside region located outside the estimated region, and can extract the human figure region based on the evaluation value.

In addition, the human figure region extraction means can extract the human figure region by using skin color information in the image.

A human figure region extraction program of the present invention is a program for extracting a human figure region in an image, and the program causes a computer to execute the procedures of:

detecting a face or facial part in the image;

determining an estimated region which is estimated to include the human figure region, based on position information of the detected face or facial part;

extracting the human figure region in the estimated region;

judging whether at least a portion of the extracted human figure region exists in an outline periphery region in the estimated region;

extending and updating the estimated region so as to include a near outer region that is located near the human figure region in the outline periphery region and outside the estimated region, in the case where at least a portion of the human figure region has been judged to exist; and extracting the human figure region in the extended and updated estimated region.

The estimated region may be determined only from the position information of the face or facial part or from the position information as well as other information such as face size information for the case of face, for example.

The outline periphery region refers to a region of a predetermined range from an outline of the estimated region within the estimated region, and may refer to a region of the predetermined range including the outline, a region of the predetermined range excluding the outline, or only the outline.

According to the human figure region extraction method and apparatus of the present invention, the face or facial part is detected in the image, and the estimated region which is estimated to include the human figure region is determined from the position information of the detected face or facial part. The human figure region is extracted in the estimated region, and judgment is made on whether at least a portion of the human figure region exists in the outline periphery region. In the case where a result of the judgment is affirmative, the estimated region is extended and updated so as to include the near outer region located near the human figure region existing in the outline periphery region and outside the estimated region. The human figure region is then extracted in the extended and updated estimated region. In this manner, attention is paid to the characteristics of human figure regions (that is, a torso is connected below a head and limbs are connected to the torso) to determine the estimated region that is to include the human figure region, with reference to a head based on the position information or the like of the head identified by the face or facial part. The human figure region is extracted in the estimated region, and the estimated region is extended and updated based on the result of human figure region extraction in the estimated region, in order to extract the human figure region in the extended and updated estimated region. Therefore, correction of the estimated region as a range of human figure extraction can be carried out according to the diversity in the states of the human figure, which can take various poses or the like. Consequently, human figure region extraction processing can be carried out automatically and accurately in a general image.

In the human figure region extraction method and apparatus of the present invention, if processing of judgment on whether at least a portion of the human figure region exists in the outline periphery region and processing of estimated region extension and update and human figure region extraction in the extended and updated estimated region are repeated until the human figure region does not exist in the outline periphery region, the human figure region can be included in the estimated region extended and updated according to the result of human figure region extraction, even in the case where the human figure region has not been contained in the estimated region. In this manner, the whole human figure region can be extracted with certainty.

In the case where the human figure region extraction is carried out based on the evaluation value calculated for each pixel in the estimated region based on the image data therein and in the outside region located outside the estimated region, judgment can be appropriately made as to whether each pixel in the estimated region represents the human figure region or a background region, by using the image data of the estimated region largely including the human figure region and the image data of the outside region located outside the estimated region and including largely the background region.

In addition, in the case where the human figure region extraction is carried out by use of the skin color information in the image, accuracy of the human figure region extraction can be improved.

BRIEF DESCRIPTION OF THE DRAWINGS

FIG. 3A is a graph showing R (Red) and G (Green) in a face region model $G_F$ while

DESCRIPTION OF THE PREFERRED EMBODIMENT

Figure 1:
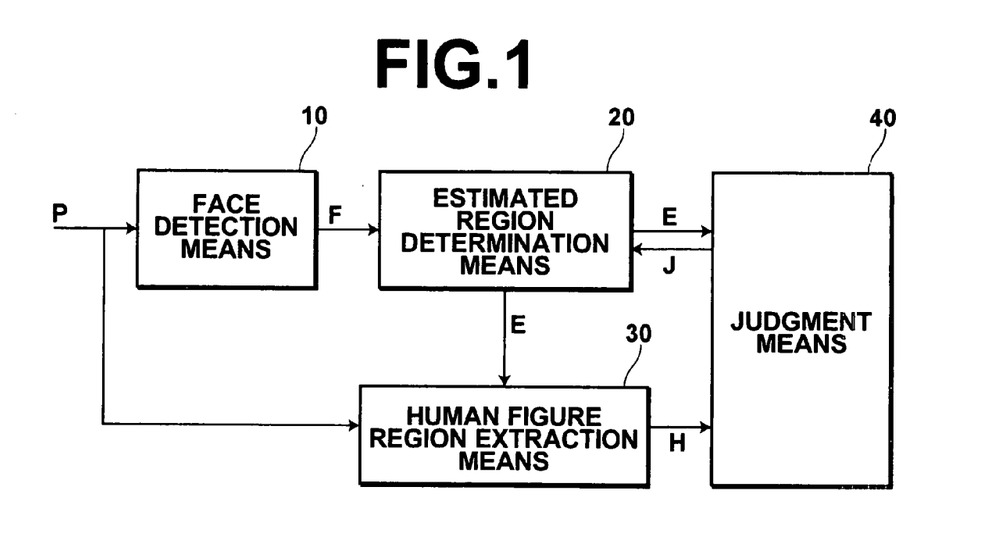
FIG. 1 is a block diagram showing an embodiment of a human figure region extraction apparatus of the present invention.

Hereinafter, an embodiment of a human figure region extraction apparatus of the present invention will be described with reference to the accompanying drawings. A human figure region extraction apparatus as an embodiment of the present invention shown in FIG. 1 is realized by execution of an image processing program read into an auxiliary storage apparatus on a computer (such as a personal computer). The image processing program is stored in an information recording medium such as a CD-ROM or distributed via a network such as the Internet, and installed in the computer.

The human figure region extraction apparatus in this embodiment automatically extracts a human figure region H in a general image P, and comprises face detection means 10, estimated region determination means 20, human figure region extraction means 30, and judgment means 40. The face detection means 10 detects a face F in the image P. The estimated region determination means 20 determines an estimated region E which is estimated to include the human figure region H, based on position information and size information of the detected face F. The human figure region extraction means 30 extracts the human figure region H in the determined estimated region E. The judgment means 40 judges whether at least a portion of the human figure region H exists in an outline periphery region of the estimated region E.

In the case where the judgment means 40 has judged that at least a portion of the human figure region H exists in the outline periphery region of the estimated region E, the estimated region determination means 20 extends and updates the estimated region E so as to include a near outer region existing outside the estimated region E and near the human figure region H included in the outline periphery region. The human figure region extraction means 30 then extracts the human figure region H in the extended and updated estimated region E (hereinafter, the extended and updated estimated region E will simply be referred to as the extended estimated region).

The face detection means 10 detects the face F in the image P, and detects a region representing a face as the face F. The face detection means 10 firstly obtains detectors corresponding to characteristic quantities, and the detectors recognize a detection target such as a face or eyes by pre-learning the characteristic quantities of pixels in sample images wherein the detection target is known, that is, by pre-learning directions and magnitudes of changes in density of the pixels in the images, as has been described in Japanese Unexamined Patent Publication No. 2006-139369, for example. The face detection means 10 then detects a face image by using this known technique, through scanning of the image with the detectors. The face detection means 10 thereafter detects eye positions Er and El in the face image.

Figure 2A:
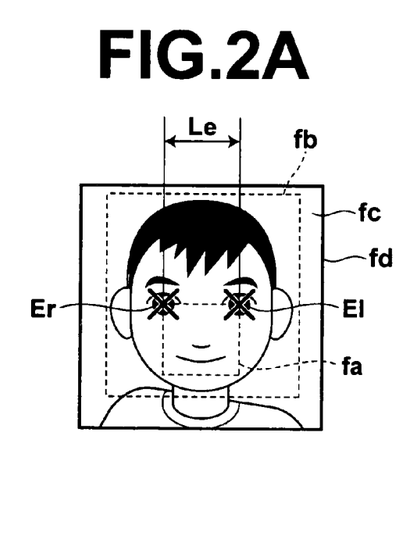
FIGS. 2A and 2B show how a face F is detected by face detection means in FIG. 1.

The face detection means 10 finds a distance D (indicated as Le) between the detected eye positions Er and El as shown in FIG. 2A, and determines a D×D square region fa such that the midpoint of the upper side of the region fa is positioned at the midpoint between the eye positions. The face detection means also determines a rectangular region fb of 3.5 D (in the vertical direction)×3.0 D (in the horizontal direction) such that the center of the rectangular region is positioned at the midpoint between the eye positions. Thereafter, the face detection means 10 determines a region fd of a predetermined size that is sufficiently large to include the regions fa and fb. The region outside the region fa in the region fd is a region fc. Since the region fa has been set to have the size that is sufficiently included in the face F, image data in the region fa mainly include image data of the face F while image data in the region fc mainly include image data of a background region.

A set of pixels in each of the regions fa and fc is then divided into 8 sets according to a color clustering method described in M. Orchard and C. Bouman, "Color Quantization of Images", IEEE Transactions on Signal Processing, Vol. 39, No. 12, pp. 2677-2690, 1991.

In the color clustering method, the direction along which variation in colors (color vectors) is greatest is found in each of a plurality of clusters (the sets of pixels) $C_n$, and the cluster $C_n$ is split into two clusters $C_{2n}$ and $C_{2n+1}$ by a plane that is perpendicular to the direction and passes a mean value (mean vector) of the colors of the cluster $C_n$. According to this method, the whole set of pixels having various color spaces can be segmented into subsets of the same or similar colors.

A mean vector $u_{rgb}$, a variance-covariance matrix $\Sigma$, and the like of a Gaussian distribution of R (Red), G (Green), and B (Blue) are calculated for each of the 8 sets in each of the regions fa and fc, and a GMM (Gaussian Mixture Model) model G is found in an RGB color space in each of the regions fa and fc according to the following equation (1). The GMM model G found from the region fa that largely includes the image data of the face F is a face region model $G_F$ and the GMM model G found from the region fc that largely includes the image data of the background of the face F is a face background region model $G_C$.

$$G = \sum_{i=1}^{8} \lambda_i \frac{1}{(2\pi)^{d/2} |\Sigma|^{1/2}} \exp\left[-\frac{1}{2}(x-u_i)^t \Sigma^{-1} (x-u)\right] \quad (1)$$

In Equation (1), i, $\lambda$, u, $\Sigma$, and d respectively refer to the number of mixture components of the Gaussian distributions (the number of the sets of pixels), mixture weights for the distributions, the mean vectors of the Gaussian distributions of RGB, the variance-covariance matrices of the Gaussian distributions, and the number of dimensions of a characteristic vector.

Figure 3A:
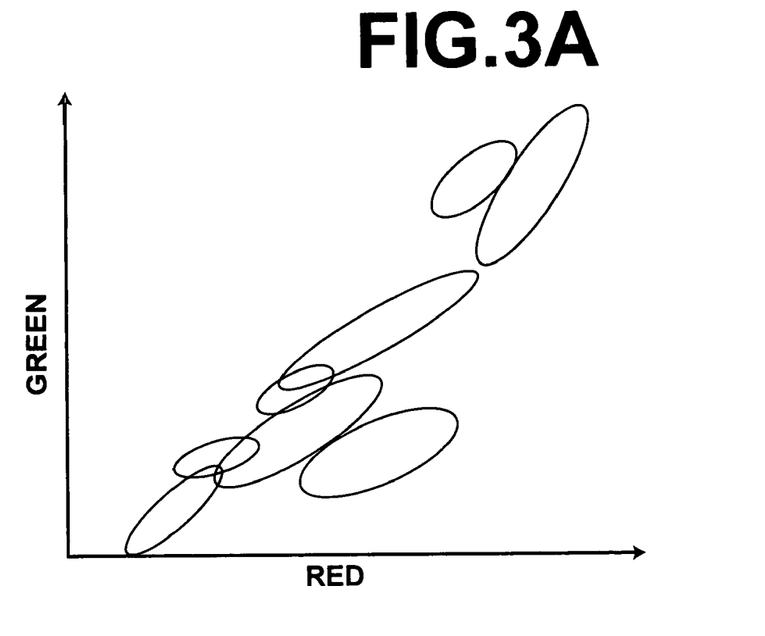
Figure 3B:
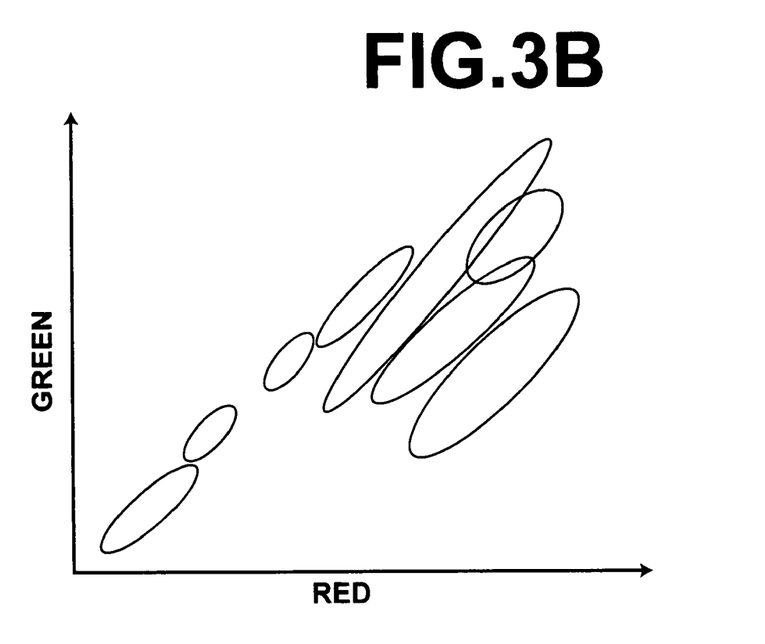
FIG. 3B is a graph showing R and G in a face background region model $G_c$.

FIG. 3A is a graph showing R and G in the face region model $G_F$ while FIG. 3B is a graph showing R and G in the face background region model $G_C$. Each of the graphs comprises 8 elliptic Gaussian distributions, and the face region model $G_F$ has different probability density from the face background region model $G_C$.

The region fb is then cut into a face region and a background region according to region segmentation methods described in Y. Boykov and M. Jolly, "Interactive Graph Cuts for Optimal Boundary & Region Segmentation of Objects in N-D images", Proc. of Int. Conf. on Computer Vision, Vol. I, pp. 105-112, 2001 and C. Rother et al., "GrabCut-Interactive Foreground Extraction using Iterated Graph Cuts", ACM Transactions on Graphics (SIGGRAPH' 04), 2004, based on the face region model $G_F$ and the face background region model $G_C$.

Figure 4A:
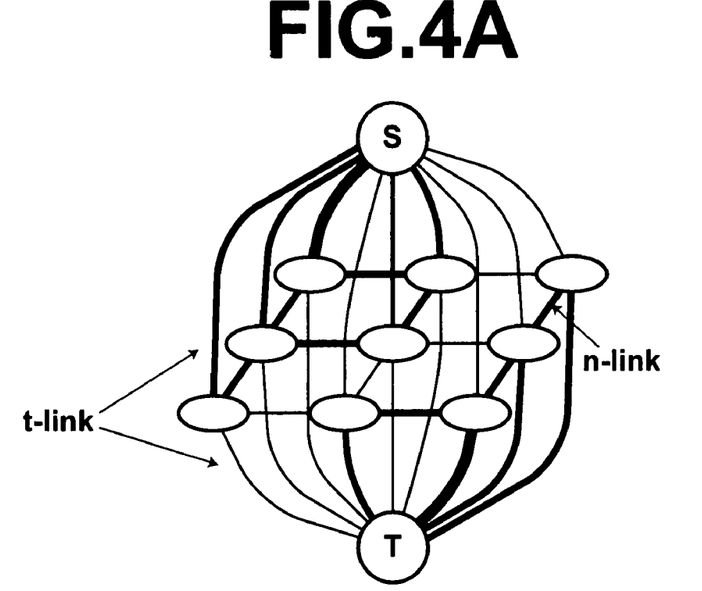
FIGS. 4A and 4B show a method of cutting a region fb into a face region and a face background region.

In the region segmentation methods described above, a graph is generated as shown in FIG. 4A comprising nodes representing the respective pixels in the image, nodes S and T representing labels (either the face region or the face background region in this embodiment) for the respective pixels, n-links connecting the nodes of pixels neighboring each other, and t-links connecting the nodes of the respective pixels with the node S representing the face region and the node T representing the face background region. Each of the n-links represents a likelihood (cost) of the neighboring pixels belonging to the same region by the thickness thereof, and the likelihood (cost) can be found from a distance between the neighboring pixels and a difference in the color vectors thereof. The t-links represent likelihoods (cost) of each of the pixels belonging to the face region and to the face background region, and the likelihoods (cost) can be found for each of the pixels by calculating probabilities that the color vector thereof corresponds to probability density functions for the face region $G_F$ and the face background region $G_C$.

Figure 4B:
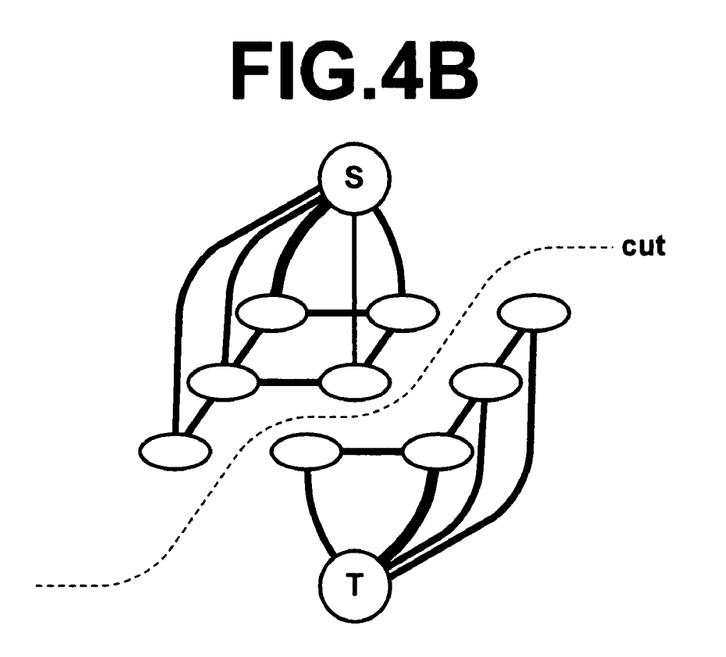

The face region and the face background region are mutually exclusive, and the region fb is cut into the face region and the face background region as shown in FIG. 4B by cutting either one of the t-links connecting the node of each of the pixels to the node S or T representing the face region or the face background region and by cutting the n-links that connect the neighboring nodes having the different labels. By causing a total of the cost for cutting the t-links and the n-links to become minimal, the region segmentation can be carried out optimally, and the face region can be detected efficiently. The face region extracted in this manner is detected as the face F.

Figure 2B:
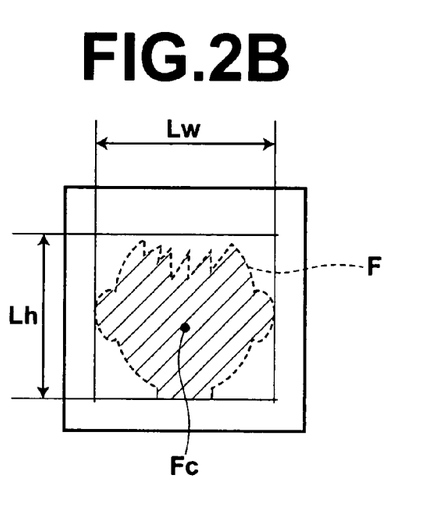
Figure 5:
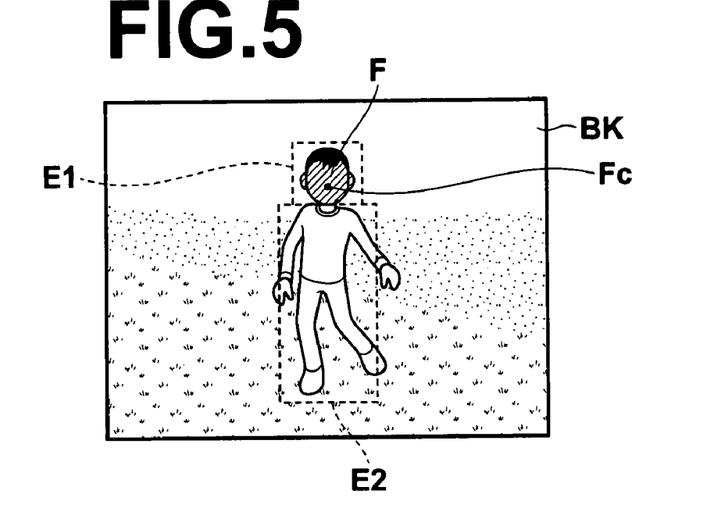
FIG. 5 shows an example of an estimated region determined by estimated region determination means in FIG. 1.

The estimated region determination means 20 determines the estimated region E which is estimated to include the human figure region, based on the position information and the size information of the face F detected by the face detection means 10. As shown in FIG. 5, the estimated region determination means 20 determines a rectangular region E1 which is centered at a position Fc of the center of the face F and has a horizontal width and a vertical width being 1.5 times a maximum horizontal width (Lw in FIG. 2B) and a maximum vertical width (Lh in FIG. 2B) of the face F, respectively. The estimated region determination means 20 determines below the region E1 a rectangular region E2 whose horizontal width and vertical width are 3 times a maximum horizontal width and 7 times a maximum vertical width of the region E1. The estimated region determination means 20 then determines the regions E1 and E2 as the estimated region E (where the lower side of the region E1 is in contact with the upper side of E2 and the regions E1 and E2 are not disconnected).

The estimated region determination means 20 has a function of extending and updating the estimated region E. In the case where the judgment means 40 that will be described later has judged that at least a portion of the human figure region H exists in the outline periphery region in the estimated region E, the estimated region determination means 20 extends and updates the estimated region E so as to include a near outer region existing near the human figure region H in the outline periphery region and located outside the estimated region E.

The human figure region extraction means 30 calculates an evaluation value for each of the pixels in the estimated region E, based on image data in the estimated region E determined by the estimated region determination means 20 and image data of an outside region OR located outside the estimated region E. The human figure region extraction means 30 extracts the human figure region H based on the evaluation value. In this embodiment, the evaluation value is a likelihood.

In the estimated region E and in the outside region OR located outside the estimated region E, a set of pixels therein is divided into 8 sets by the color clustering method described above. A mean vector $u_{rgb}$, a variance-covariance matrix $\Sigma$, and the like of a Gaussian distribution of R, G, and B are calculated for each of the 8 sets in each of the regions E and B, and a GMM model G is found in an RGB color space in each of the regions E and B according to Equation (1). The GMM model G found from the estimated region E that is estimated to include more of the human figure region is a human figure region model $G_H$, and the GMM model G found from the outside region OR that is located outside the estimated region E and includes more of a background region is a background region model $G_B$.

The estimated region E is cut into the human figure region H and the background region BK by using the same region segmentation methods as the face detection means 10. Firstly, an n-link representing a likelihood (cost) of every neighboring pixels belonging to the same region is found from a distance between the neighboring pixels and a difference in color vectors thereof. By calculating a probability of the color vector of each of the pixels corresponding to a probability density function of the human figure region model $G_H$ or to a probability density function of the human figure region model $G_H$, a t-link representing a likelihood of each of the pixels belonging to the human figure region or the background region can be found. Thereafter, the estimated region E is cut into the human figure region H and the background region BK according to the above-described region segmentation optimization method by cutting the links of minimal cost. In this manner, the human figure region H is extracted.

Furthermore, the human figure region extraction means 30 judges that each of the pixels in the estimated region E is a pixel representing a skin color region in the case where values (0~255) of R, G, and B thereof satisfy the following equation (2), and updates values of the t-links connecting the nodes of the pixels belonging to the skin color region to the node S representing the human figure region. Since the likelihood (cost) that the pixels in the skin color region are pixels representing the human figure region can be increased through this procedure, human figure region extraction performance can be improved by applying skin color information that is specific to human bodies to the extraction.

$$R>95 \text{ and } G>40 \text{ and } B>20 \text{ and } \max\{R,G,B\}-\min\{R,G,B\}>15 \text{ and } |R-G|>15 \text{ and } R>G \text{ and } R>B \quad (2)$$

Figure 6:
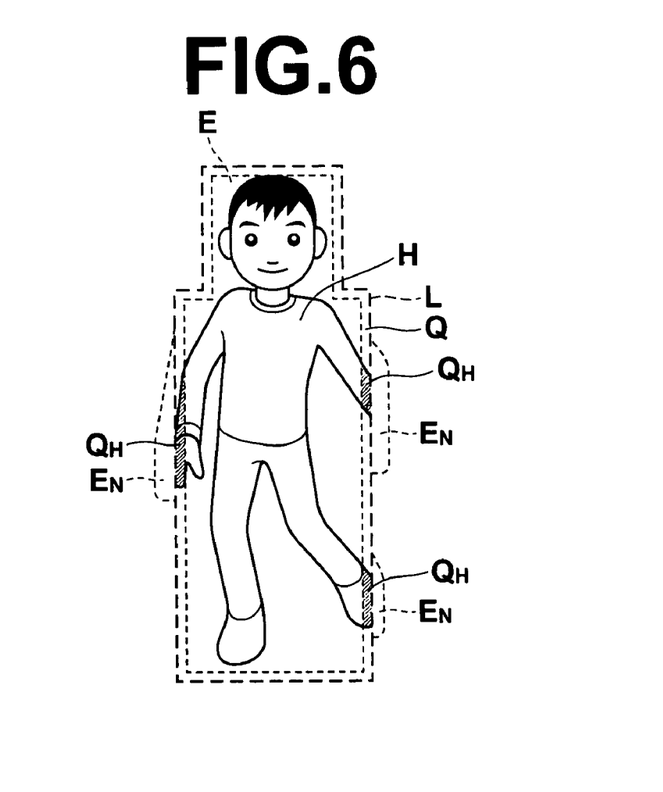
FIG. 6 shows a method of judgment processing and estimated region extension and update processing by judgment means and the estimated region determination means in FIG. 1.

The judgment means 40 judges whether at least a portion of the human figure region H extracted by the human figure region extraction means 30 exists in the outline periphery region in the estimated region E. As shown in FIG. 6, the judgment means 40 carries out this judgment by finding presence or absence of a region $Q_H$ wherein the extracted human figure region H overlaps an outline periphery region Q as a region of a predetermined range from an outline L of the estimated region E.

In the case where the judgment means 40 has judged that the human figure region H does not exist in the outline periphery region Q, human figure region extraction has been completed. However, in the case where at least a portion of the human figure region H has been judged to exist in the outline periphery region Q, the estimated region determination means 20 sets as a near outer region $E_N$ a region existing outside the estimated region E in a region of a predetermined range from the region $Q_H$ having the overlap between the human figure region H and the outline periphery region Q, and extends and updates the estimated region E to include the near outer region $E_N$. The human figure region extraction means 30 extracts the human figure region H again in the extended estimated region E thereafter, and the judgment means 40 judges whether at least a portion of the human figure region H exists in the outline periphery region Q in the extended estimated region E.

The procedures described above, that is, the extension and update of the estimated region E by the estimated region determination means 20, the extraction of the human figure region H in the extended estimated region E by the human figure region extraction means 30, and the judgment of presence or absence of at least a portion of the human figure region H in the outline periphery region Q by the judgment means 40, are carried out until the judgment means 40 has judged that the human figure region H does not exist in the outline periphery region Q.

Figure 7A:
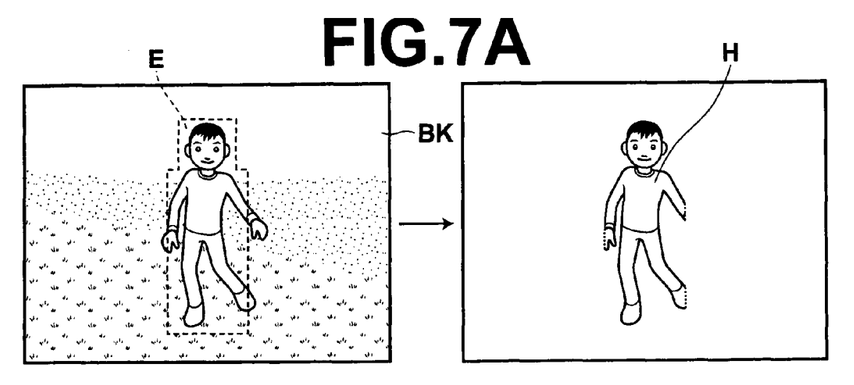
FIGS. 7A to 7C show an example of a human figure region H extracted in an estimated region E extended and update by the estimated region determination means in FIG. 1, and FIGS. 7A to 7C respectively show the estimated region E and the extracted human figure region H in initial processing, in processing for the second time, and in final processing.
Figure 7B:
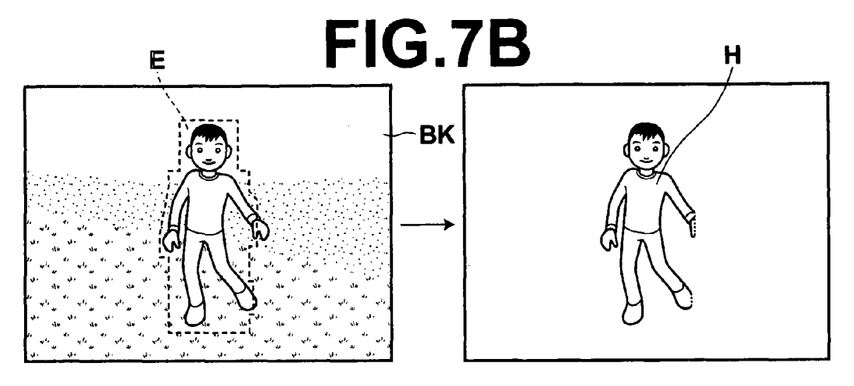

FIGS. 7A to 7C show an example of repetitive extraction of the human figure region H while the estimated region E is extended and updated. FIG. 7A shows the estimated region E determined initially based on the position information and the like of the face F, and the human figure region H extracted in the estimated region E. FIG. 7B shows the region E estimated for the second time by extension and update thereof based on the initial human figure region extraction result shown in FIG.

Figure 7C:
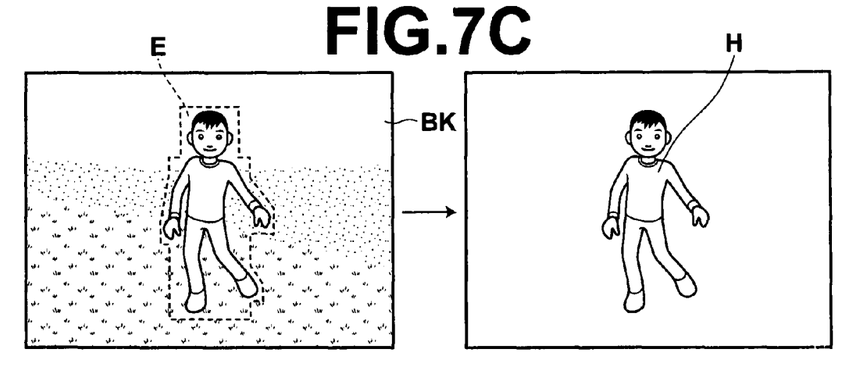

7A, and the human figure region H extracted in the extended estimated region E. FIG. 7C shows the ultimately determined estimated region E and the human figure region H extracted therein.

Figure 8:
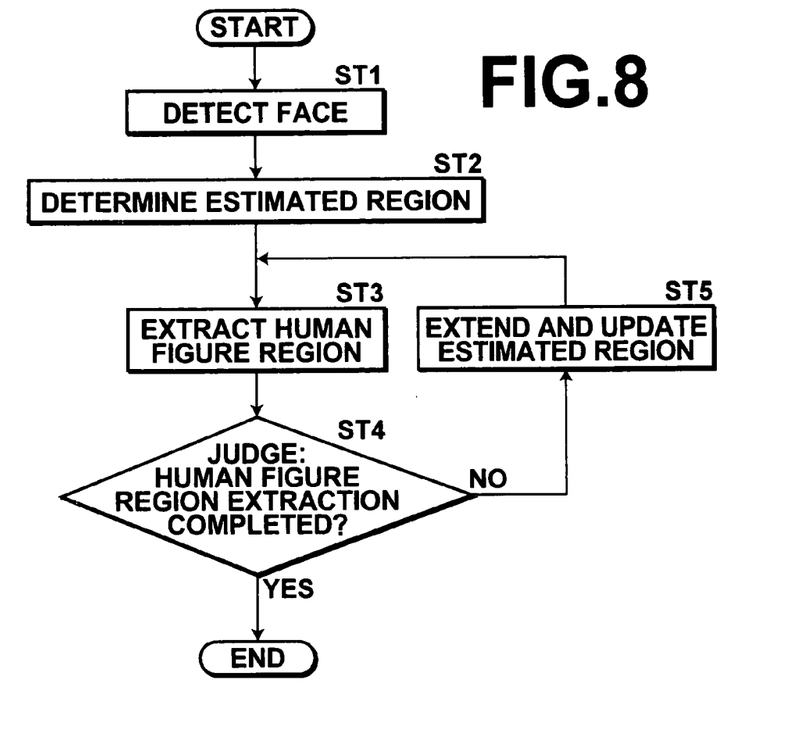
FIG. 8 is a flow chart as an embodiment of a human figure region extraction method of the present invention.

An embodiment of the human figure region extraction method of the present invention will be described next with reference to a flow chart in FIG. 8. The face detection means 10 detects the face F in the image P (Step ST1). Thereafter, the estimated region determination means 20 determines the estimated region E which is estimated to include the human figure region H according to the position information and the size information of the detected face F (Step ST2). The human figure region extraction means 30 extracts the human figure region H in the estimated region E having been determined (Step ST3), and the judgment means 40 judges whether at least a portion of the human figure region H exists in the outline periphery region in the estimated region E (Step ST4). In the case where a result of the judgment is affirmative, the estimated region E is extended and updated so as to include the near outer region located outside the estimated region E and near the human figure region H in the outline periphery region (Step ST5). The flow of processing then returns to Step ST3, and the human figure region H is extracted in the extended estimated region E. The extraction of the human figure region H is completed when the human figure region H has been judged not to exist in the outline periphery region after repetition of the procedures from Step ST3 to Step ST5.

According to this embodiment, the face F is detected in the image P, and the estimated region E which is estimated to include the human figure region H is determined based on the position information and the like of the detected face F. The human figure region H is extracted in the estimated region E, and the judgment is made as to whether at least a portion of the human figure region H exists in the outline periphery region of the estimated region E. The estimated region E is extended and updated so as to include the near outer region that is near the human figure region H in the outline periphery region and outside the estimated region E until the human figure region H has been judged not to exist in the outline periphery region. The human figure region H is then extracted in the extended estimated region. By repeating these procedures, the human figure region can be included in the extended estimated region E based on the result of human figure region extraction even in the case where the human figure region H has not been contained in the estimated region E. In this manner, the extraction of the whole human figure region can be carried out automatically and with certainty in the general image.

The present invention is not necessarily limited to the embodiment described above. For example, in the embodiment described above, the estimated region determination means 20 determines the estimated region E which is estimated to include the human figure region H, based on the position information and the size information of the face F detected by the face detection means 10. However, the face detection means 10 can detect anything by which the estimated region determination means 20 can identify a position of a head as a reference to determine a position of the estimated region which is estimated to include the human figure region. Therefore, the face detection means 10 may detect not only a position of a face but also a position of other facial parts such as eyes, a nose, or a mouth. Furthermore, if the detected face or facial part can be used to identify an approximate size of the head from a size of the face, a distance between the eyes, a size of the nose, a size of the mouth, or the like, the size of the estimated region can be determined more accurately.

For example, a distance D may be found between the positions of the eyes detected by the face detection means 10 so that a rectangular region E1 of 3D×3D centered at the midpoint of the eyes can be determined. A rectangular region E2 whose horizontal width and vertical width are 3 times the horizontal width and 7 times the vertical width of the region E1 is then determined below the region E1, and the regions E1 and E2 can be determined as the estimated region E (where the lower side of the region E1 is in contact with the upper side of the region E2 and the regions E1 and E2 are not disconnected). In the case where the estimated region E is determined only from the position of the face detected by the face detection means 10, the estimated region E can be a region of a preset shape and size determined from a position of the center of the face as a reference point.

The estimated region E may be a region that can sufficiently include the human figure region, and can be any region of any arbitrary shape, such as a rectangle, a circle, or an ellipse of any size.

When the human figure region H is extracted by the human figure region extraction means 30 through calculation of the evaluation value for each of the pixels in the estimated region E based on the image data of the estimated region E and based on the image data of the outside region OR located outside the estimated region E, the image data of the estimated region E and the image data of the outside region OR may be image data representing the entirety or a part of each region.

The human figure region extraction means 30 judges whether each of the pixels in the estimated region E represents the skin color region according to the condition represented by Equation (2) above. However, this judgment may be carried out based on skin color information that is specific to the human figure in the image P. For example, a GMM model G represented by Equation (1) above is found from a set of pixels judged to satisfy the condition of Equation (2) in a predetermined region such as in the image P, and used as a probability density function including the skin color information specific to the human figure in the image P. Based on the probability density function, whether each of the pixels in the estimated region E represents the skin color region can be judged again.

In the above embodiment, the judgment means 40 judges the presence or absence of the region $Q_H$ having an overlap between the outline periphery region Q and the human figure region H, and the estimated region determination means 20 extends and updates the estimated region E so as to include the near outer region $E_N$ located outside the estimated region E, out of the region of the predetermined range from the region $Q_H$. However, the estimated region E may be extended and updated through judgment of the presence or absence of at least a portion of the human figure region in the outline periphery region in the estimated region according to a method described below or according to another method.

Figure 9:
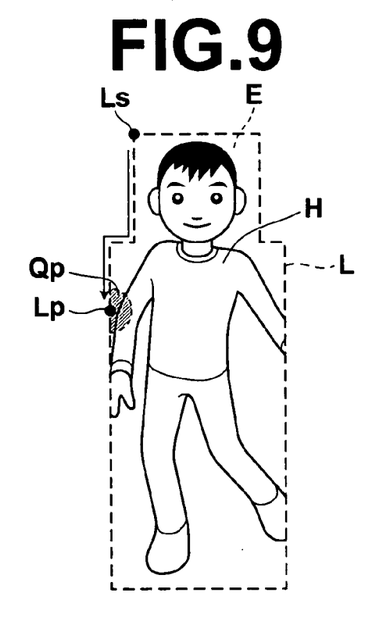
FIG. 9 shows another method of judgment processing and estimated region extension and update processing by the judgment means and the estimated region determination means.

More specifically, as shown in FIG. 9, a predetermined point on the outline L of the estimated region E is designated as a starting point $L_s$ and a target pixel $L_p$ sequentially denotes each of the pixels along the outline L in clockwise or counterclockwise direction. Whether at least a portion of the human figure region H exists in the outline periphery region can be judged through judgment as to whether the human figure region H exists in a region $Q_p$ inside the estimated region E in a region of a predetermined range from the pixel $L_p$. In the case where presence of at least a portion of the human figure region has been found, a position of the target pixel $L_p$ is updated according to a method described below.

Figure 10A:
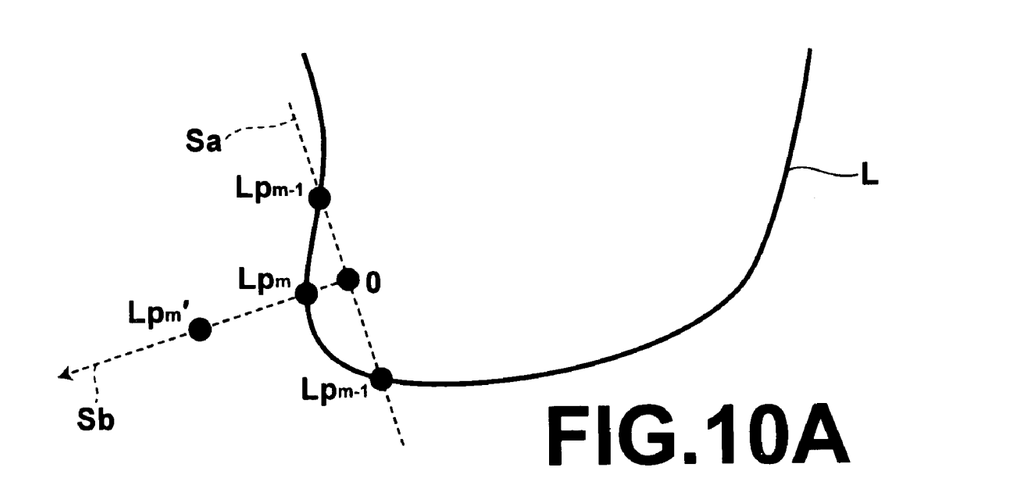
FIGS. 10A and 10B show how the estimated region is extended and updated by the estimated region determination means.
Figure 10B:
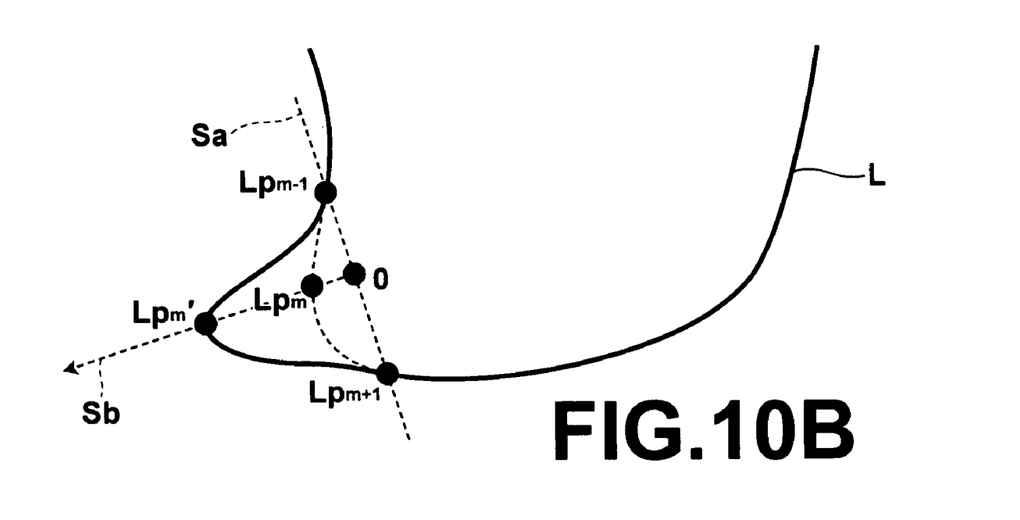

Firstly, as shown in FIG. 10A, a straight line Sa passing pixels $Lp_{m-1}$ and $Lp_{m+1}$ sandwiching a pixel $Lp_m$ whose position is to be updated along the outline L is found, and an outwardly normal line Sb passing the pixel $Lp_m$ from the line Sa is found. Let the intersection of the lines Sa and Sb be denoted by O. The position of the pixel $Lp_m$ is updated to a point $Lp_m'$ on the normal line Sb at a predetermined distance λ (where λ is an increment to grow the outline once) from the point O. Thereafter, as shown in FIG. 10B, the outline L of the estimated region E is updated to pass the point $Lp_m'$, and the estimated region E is updated as a region surrounded by the updated outline L. In this manner, the estimated region E can be extended and updated.

In the above embodiment, the extension and update of the estimated region E and the human figure region extraction in the extended estimated region and the like are carried out in the case where the judgment means 40 has judged that at least a portion of the human figure region exists in the outline periphery region of the estimated region E. However, the extension and update of the estimated region and the extraction of the human figure region therein may be carried out in the case where the number of positions at which the human figure region exists in the outline periphery region in the estimated region is equal to or larger than a predetermined number.

In the above embodiment, the extension and update of the estimated region and the extraction of the human figure region therein are repeated until the human figure region has been judged not to exist in the outline periphery region. However, a maximum number of the repetitions may be set in advance so that the extraction of the human figure region can be completed within a predetermined number of repetitions that is preset to be equal to or larger than 1.

What is claimed is:

1. A human figure region extraction method for extracting a human figure region in a single image, the method comprising the steps of:
    detecting a face or facial part in the image;
    determining an estimated region which is estimated to include the human figure region, based on position information of the detected face or facial part;
    extracting the human figure region in the estimated region;
    judging whether at least a portion of the extracted human figure region exists in an outline periphery region in the estimated region;
    extending and updating the estimated region so as to include a near outer region located near the human figure region in the outline periphery region and outside the estimated region, in the case where at least a portion of the human figure region has been judged to exist; and
    extracting the human figure region in the extended and updated estimated region.

2. The human figure region extraction method according to claim 1, wherein the step of judging whether at least a portion of the human figure region exists in the outline periphery region, the step of extending and updating the estimated region, and the step of extracting the human figure region in the extended and updated estimated region are repeated until the human figure region has been judged not to exist in the outline periphery region.

3. A human figure region extraction apparatus for extracting a human figure region in an image, the apparatus comprising:
    face detection means for detecting a face or facial part in the image;
    estimated region determination means for determining an estimated region which is estimated to include the human figure region, based on position information of the detected face or facial part;
    human figure region extraction means for extracting the human figure region in the estimated region; and
    judgment means for judging whether at least a portion of the extracted human figure region exists in an outline periphery region in the estimated region, wherein,
    in the case where the judgment means has judged that at least a portion of the human figure region exists, the estimated region determination means extends and updates the estimated region so as to include a near outer region located near the human figure region in the outline periphery region and outside the estimated region and the human figure region extraction means extracts the human figure region in the extended and updated estimated region.

4. The human figure region extraction apparatus according to claim 3, wherein the judgment means, the estimated region determination means, and the human figure region extraction means repeatedly judges whether at least a portion of the human figure region exists in the outline periphery region, extends and updates the estimated region, and extracts the human figure region in the extended and updated estimated region until the judgment means has judged that the human figure region does not exist in the outline periphery region.

5. The human figure region extraction apparatus according to claim 3, wherein the human figure region extraction means calculates an evaluation value for each pixel in the estimated region from image data therein and from image data in an outside region located outside the estimated region, and extracts the human figure region based on the evaluation value.

6. The human figure region extraction apparatus according to claim 4, wherein the human figure region extraction means calculates an evaluation value for each pixel in the estimated region from image data therein and from image data in an outside region located outside the estimated region, and extracts the human figure region based on the evaluation value.

7. The human figure region extraction apparatus according to claim 5, wherein the human figure region extraction means extracts the human figure region by using skin color information in the image.

8. The human figure region extraction apparatus according to claim 6, wherein the human figure region extraction means extracts the human figure region by using skin color information in the image.

9. A non-transitory computer-readable recording medium storing a program for extracting a human figure region in an image, the program causing a computer to execute the procedures of:
    detecting a face or facial part in the image;
    determining an estimated region which is estimated to include the human figure region, based on position information of the detected face or facial part;
    extracting the human figure region in the estimated region;
    judging whether at least a portion of the extracted human figure region exists in an outline periphery region in the estimated region;
    extending and updating the estimated region so as to include a near outer region located near the human figure region in the outline periphery region and outside the estimated region, in the case where at least a portion of the human figure region has been judged to exist; and
    extracting the human figure region in the extended and updated estimated region.

* * * * *